United States Patent
Lim et al.

(10) Patent No.: US 10,411,249 B2
(45) Date of Patent: Sep. 10, 2019

(54) LITHIUM SECONDARY BATTERY HAVING IMPROVED OUTPUT CHARACTERISTICS

(71) Applicant: LG CHEM, LTD., Seoul (KR)

(72) Inventors: Soo-Hyun Lim, Daejeon (KR); Dae-Hong Kim, Daejeon (KR); Won-Hee Jeong, Daejeon (KR); Tae-Jin Park, Daejeon (KR)

(73) Assignee: LG CHEM, LTD., Seoul (KR)

( * ) Notice: Subject to any disclaimer, the term of this patent is extended or adjusted under 35 U.S.C. 154(b) by 207 days.

(21) Appl. No.: 15/542,994

(22) PCT Filed: Jan. 21, 2016

(86) PCT No.: PCT/KR2016/000674
§ 371 (c)(1),
(2) Date: Jul. 12, 2017

(87) PCT Pub. No.: WO2016/117950
PCT Pub. Date: Jul. 28, 2016

(65) Prior Publication Data
US 2018/0013128 A1    Jan. 11, 2018

(30) Foreign Application Priority Data
Jan. 21, 2015 (KR) .................. 10-2015-0010016

(51) Int. Cl.
*H01M 4/02* (2006.01)
*H01M 4/131* (2010.01)
(Continued)

(52) U.S. Cl.
CPC ........... *H01M 4/131* (2013.01); *H01M 4/405* (2013.01); *H01M 4/485* (2013.01);
(Continued)

(58) Field of Classification Search
CPC ..................................................... H01M 4/02
See application file for complete search history.

(56) References Cited

U.S. PATENT DOCUMENTS

| | | |
|---|---|---|
| 6,274,271 B1 | 8/2001 | Koshiba et al. |
| 8,343,667 B2 | 1/2013 | Saruwatari et al. |

(Continued)

FOREIGN PATENT DOCUMENTS

| | | |
|---|---|---|
| EP | 2 051 319 A2 | 4/2009 |
| JP | 10-69922 A | 3/1998 |

(Continued)

OTHER PUBLICATIONS

Cheng, J., et al, "Hierarchical hollow Li4Ti5O12 urchin-like microspheres with ultra-high specific surface area for high rate lithium ion batteries," Nano Research, 2014, vol. 7, No. 7, pp. 1043-1053.

(Continued)

*Primary Examiner* — Jacob B Marks
(74) *Attorney, Agent, or Firm* — Birch, Stewart, Kolasch & Birch, LLP

(57) ABSTRACT

The present disclosure relates to a lithium secondary battery using lithium titanium oxide (LTO) as a negative electrode active material. More specifically, the present disclosure relates to a secondary battery having improved input and output characteristics through the optimization of the pore ratio of the LTO. The lithium secondary battery including the lithium titanium oxide negative electrode active material according to the present disclosure provides an effect of significantly improved output density through the maximization of reaction active sites with electrolyte due to a porous structure.

13 Claims, 2 Drawing Sheets

(51) Int. Cl.
  *H01M 10/052* (2010.01)
  *H01M 4/40* (2006.01)
  *H01M 4/485* (2010.01)
(52) U.S. Cl.
  CPC .... *H01M 10/052* (2013.01); *H01M 2004/021* (2013.01); *H01M 2004/027* (2013.01)

(56) References Cited

U.S. PATENT DOCUMENTS

| 2006/0222949 | A1 | 10/2006 | Minamida et al. |
| 2010/0178556 | A1 | 7/2010 | Manev et al. |
| 2012/0070744 | A1* | 3/2012 | Moriyama ........... C01G 23/005 429/231.1 |
| 2012/0270093 | A1 | 10/2012 | Isozaki et al. |
| 2013/0189582 | A1 | 7/2013 | Lee |
| 2014/0017567 | A1 | 1/2014 | Oh et al. |

FOREIGN PATENT DOCUMENTS

| JP | 2006-278282 A | 10/2006 |
| JP | 2008-243729 A | 10/2008 |
| JP | 2014-86164 A | 5/2014 |
| KR | 10-2011-0117157 A | 10/2011 |
| KR | 10-2012-0023021 A | 3/2012 |
| KR | 10-2013-0085323 A | 7/2013 |
| KR | 10-2013-0106610 A | 9/2013 |
| KR | 10-2014-0008957 A | 1/2014 |
| KR | 10-2014-0009921 A | 1/2014 |

OTHER PUBLICATIONS

Tang, Y., et al, "Template-free synthesis of mesoporous spinel lithium titanate microspheres and their application in high-rate lithium ion batteries," J. Mater. Chem., Jan. 1, 2009, vol. 19, No. 33, pp. 5980-5984.

Vu, A., et al, "Porous Electrode Materials for Lithium-Ion Batteries—How to Prepare Them and What Makes Them Special," Adv. Energy Mater., Sep. 1, 2012, vol. 2, No. 9, pp. 1056-1085.

Yin, Y.X., et al, "Lithium-Sulfur Batteries: Electrochemistry, Materials, and Prospects," Angew. Chem. Int. Ed., Dec. 9, 2013, vol. 52, No. 50, pp. 13186-13200.

International Search Report, issued in PCT/KR2016/000674 (PCT/ISA/210), dated Apr. 18, 2016.

Pang et al., "Lithium Migration in $Li_4Ti_5O_{12}$ Studied Using in Situ Neutron Powder Diffraction", Chemistry of Materials, Apr. 2014, vol. 26, pp. 2318-2326. https://www.researchgate.net/publication/262301150.

* cited by examiner

LITHIUM SECONDARY BATTERY HAVING IMPROVED OUTPUT CHARACTERISTICS

TECHNICAL FIELD

The present application claims priority to Korean Patent Application No. 10-2015-0010016 filed on Jan. 21, 2015 in the Republic of Korea, the disclosure of which is incorporated herein by reference.

The present disclosure relates to a negative electrode using lithium titanium oxide (LTO) as a negative electrode active material, and a secondary battery comprising the same. More specifically, the present disclosure relates to a lithium secondary battery having improved output characteristics through optimization of pore ratio of the LTO.

BACKGROUND ART

With recently increased environmental concern, many researches regarding an electric vehicle or a hybrid electric vehicle that can substitute a vehicle using fossil fuel such as a gasoline vehicle or a diesel vehicle which is one of main causes of air pollution, are conducted. As a power source for the electric vehicle and the hybrid electric vehicle, a nickel hydrogen metal secondary battery is mainly used. However, researches for using a lithium secondary battery having high energy density and discharge voltage are actively conducted, and some of these are in the stages of commercialization.

For a negative electrode active material having high input and output characteristics, lithium titanium oxide (LTO) is gaining increasing attention. Spinel lithium titanium oxide, which is a representative example of the oxide having lithium intercalation and de-intercalation at a state of maintaining crystal structure, has been first introduced in 1971. Spinel lithium titanium oxide raised great interest for its possibility to be an excellent electrode material or mass storage material, because it has a superb mobility of lithium ions, and the material structure is not changed during charging and discharging. A lithium secondary battery including such lithium titanium oxide as a negative electrode active material seldom has electrolyte disintegration because oxidative/reductive potential of the negative electrode is about 1.5 V with respect to Li/Li+ potential, which is relatively high, and also has excellent cycle characteristics because of stability of a crystal structure. However, lithium titanium oxide has disadvantages in which capacity per unit weight is small and energy density is low.

In consideration of this, related technology suggests a negative electrode material including a carbon-based material and lithium titanium oxide. For example, Japanese Patent Publication No. 1998-069922 discloses a negative electrode added with lithium titanium composite oxide as a main active material and an active material having low oxidative/reductive potential as a sub-active material. Further, Japanese Patent Publication No. 2006-278282 discloses a technology of adding titanic acid lithium of a spinel structure as the negative electrode active material and a carbonaceous material as a conductor. However, the negative electrode materials using lithium titanium oxide as a main active material do not solve the problems concerning little capacity and low energy density of lithium titanium-based oxide. Accordingly, there is a high demand for a negative electrode material that can make up for the shortcomings of lithium titanium oxide, and that has a low internal resistance and high electrical conductivity, and improved output characteristics.

DISCLOSURE

Technical Problem

The present disclosure is designed to solve the problems of the related art, and therefore the present disclosure is directed to providing a lithium secondary battery using lithium titanium oxide as a negative electrode active material, in order to manufacture a battery with improved output characteristics and high temperature characteristics without causing decrease in battery capacity. The other objectives and advantages of the present disclosure can be understood with the following description and more clearly with the embodiments of the present disclosure.

Technical Solution

In order to solve the problem, there is provided a negative electrode for a lithium secondary battery including lithium titanium oxide as an electrode active material.

In a first aspect of the present disclosure, the electrode includes a current collector and a negative electrode active material layer formed on at least one side surface of the current collector, in which the negative electrode active material layer comprises lithium titanium oxide expressed with following chemical formula 1 as a negative electrode active material.

$$Li_xTi_yO_zM_w \qquad \text{[Chemical formula 1]}$$

where, M is one or a mixture of two or more selected from a group consisting of Zr, B, Sn, S, Be, Ge and Zn, and $0.5 \leq x \leq 3$, $1 \leq y \leq 5$, $2 \leq z \leq 12$, $0 \leq w < 0.1$.

In a second aspect of the present disclosure according to the first aspect, the negative electrode active material includes secondary particles in which primary particles of lithium titanium oxide (LTO) are agglomerated, the negative electrode active material layer is present with a plurality of pores, and a volume of the meso pores having a long diameter of the pore of 0.1 μm or greater accounts for 10 vol % to 50 vol % of 100 vol % of the entire pores present in the negative electrode active material layer.

In a third aspect of the present disclosure according to the first or second aspect, the meso pore includes a primary pore and/or a secondary pore, in which the primary pore is a pore formed on a surface and in a body of the primary particle, and the secondary pore is a pore formed between the adjacent primary particle and/or secondary particle.

In a fourth aspect of the present disclosure according to one of the first to third aspects, the negative electrode active material layer may include 50 vol % or more of the secondary pore compared to 100 vol % of the meso pore.

In a fifth aspect of the present disclosure according to one of the first to fourth aspects, the negative electrode active material layer has a porosity of 40% to 60%.

In a sixth aspect of the present disclosure according to one of the first to fifth aspects, lithium titanium oxide expressed with the chemical formula 1 includes one or a mixture of two or more selected from a group consisting of $Li_{0.8}Ti_{2.2}O_4$, $Li_{2.67}Ti_{1.33}O_4$, $Li_{1.33}Ti_{1.67}O_4$, $Li_{1.14}Ti_{1.71}O_4$, $Li_4Ti_5O_{12}$, and $Li_2TiO_3$.

In a seventh aspect of the present disclosure according to one of the first to sixth aspects, the lithium titanium oxide primary particle may have a diameter $D_{50}$ of 0.01 μm to 1 μm.

In an eighth aspect of the present disclosure according to one of the first to seventh aspects, the lithium titanium oxide secondary particle may have a diameter $D_{50}$ of 2 μm to 20 μm.

In a ninth aspect of the present disclosure according to one of the first to eighth aspects, the lithium titanium oxide primary particle is a porous particle having a plurality of pores formed on a surface and in a body of the particle.

In a tenth aspect of the present disclosure according to one of the first to ninth aspects, the lithium titanium oxide secondary particle is a porous particle having a plurality of pores formed on a surface and in a body of the particle.

In an eleventh aspect of the present disclosure according to one of the first to tenth aspects, a pore of the negative electrode active material layer includes a pore formed on a surface and in a body of the primary particle, a pore formed between the primary particles, a pore between the primary particle and the secondary particle, and a pore formed between the secondary particles.

In a twelfth aspect of the present disclosure according to one of the first to eleventh aspects, the negative electrode active material has lithium carbonate in an amount of 20 wt % or less compared to 100 wt % of total lithium titanium oxide.

In a thirteenth aspect of the present disclosure according to one of the first to twelfth aspects, the lithium titanium oxide has an x-ray diffraction measurement average crystallite size of 800 Å to 1300 Å.

In a fourteenth aspect of the present disclosure, there is provided a lithium secondary battery, in which the lithium secondary battery includes the negative electrode having the features according to any of the first to thirteenth aspects.

Advantageous Effects

A lithium secondary battery including a lithium titanium oxide negative electrode active material according to the present disclosure has maximized reaction active sites with an electrolyte and significantly improved output density because of porous structure of an electrode active material layer.

DESCRIPTION OF DRAWINGS

The accompanying drawings illustrate preferred embodiments of the present disclosure and together with the foregoing disclosure, serve to provide further understanding of the technical spirit of the present disclosure, and thus, the present disclosure is not construed as being limited to the drawings. Meanwhile, shape, size, scale or ratio of elements in provided drawings may be exaggerated to emphasize clarity of explanation.

BEST MODE

Figure 1:
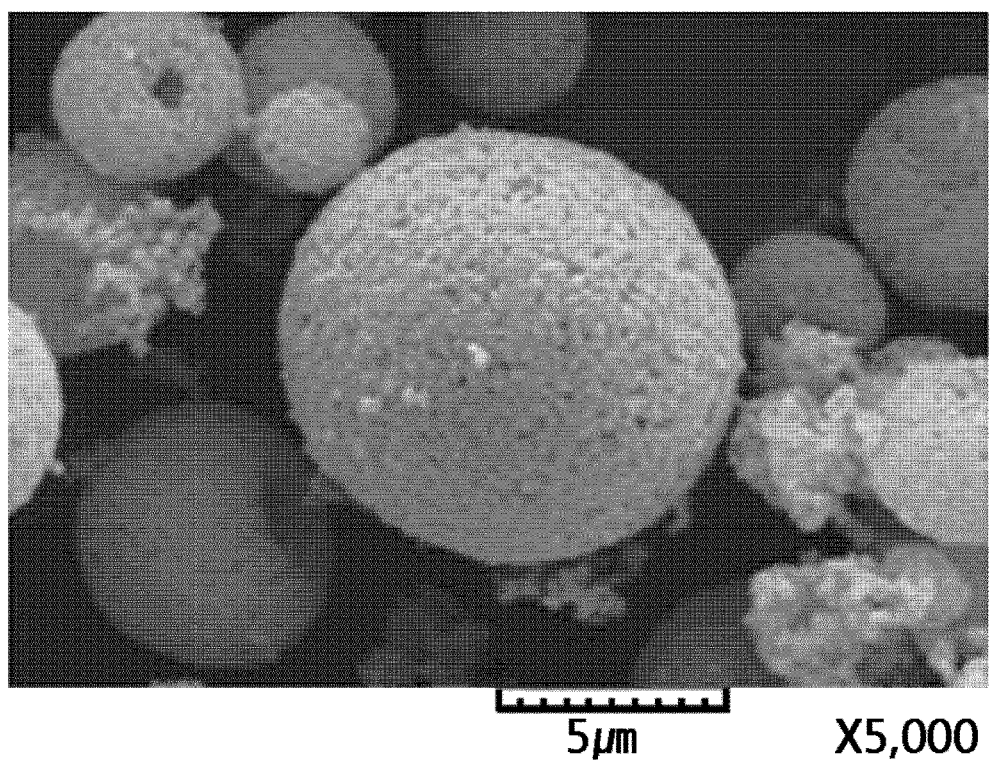
FIG. 1 illustrates SEM image of a primary particle of lithium titanium oxide according to an exemplary embodiment of the present disclosure.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the embodiments disclosed in the present specification and the configurations illustrated in the drawings are merely the most preferred embodiments of the present disclosure, and not all of them represent the technical ideas of the present disclosure, and thus it should be understood that there may be various equivalents and modified examples that could substitute therefor at the time of filing the present application.

When porosity of a negative electrode of a secondary battery is too low, output characteristics versus capacity according to an active material may deteriorate because ion and/or electron conduction is impeded. Conversely, when porosity is too high, a loading amount of the active material versus a negative electrode area is not sufficient, and interval among active material particles is too wide, which then causes degradation of conductivity. Accordingly, the present disclosure suggests a range in which a volume of a pore can be properly set in a negative electrode active material layer.

For convenience of explanation, a primary pore and a secondary pore are defined as below.

In the present disclosure, a 'primary pore' is defined as indicating a pore or an air gap formed on a surface and in a body of a primary particle. The primary pores may be connected with one or more adjacent other primary pores, thus serving as a migration path for the lithium ions, electrons and/or electrolyte.

Further, in the present disclosure, a 'secondary pore' is defined as indicating a pore or an air gap formed between two or more particles which are contacted with each other. The pore or air gap may be formed between the primary particles, between the secondary particles, or between the primary particle and the secondary particle. The secondary pores may be connected with one or more adjacent other primary pore and/or secondary pore, thus serving as a migration path for the lithium ions, electrons and/or electrolyte.

In the present disclosure, the simple expression 'pore' or 'air gap' without being modified by a specific expression may be referred to as commonly indicating all of the primary pore or air gap, and the secondary pore or air gap.

Next, the present disclosure will be specifically explained below.

The present disclosure relates to a negative electrode for a lithium secondary battery that includes lithium titanium oxide (LTO) as a negative electrode active material, and a lithium secondary battery including the negative electrode, in which a volume of a meso pore in the negative electrode having a long diameter of 0.1 μm or greater satisfies a certain range.

In a preferred embodiment of the present disclosure, the negative electrode includes a current collector, and a negative electrode active material layer formed on at least one side surface of the current collector, in which the negative electrode active material layer includes lithium titanium oxide (LTO) expressed with following chemical formula as a negative electrode active material.

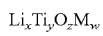  [Chemical formula 1]

where, M is one or a mixture of two or more selected from a group consisting of Zr, B, Sn, S, Be, Ge and Zn, and $0.5 \leq x \leq 3$, $1 \leq y \leq 5$, $2 \leq z \leq 12$, $0 \leq w < 0.1$.

The lithium titanium oxide may be, for example, $Li_{0.8}Ti_{2.2}O_4$, $Li_{2.67}Ti_{1.33}O_4$, $Li_{1.33}Ti_{1.67}O_4$, $Li_{1.14}Ti_{1.71}O_4$, $Li_4Ti_5O_{12}$, and $Li_2TiO_3$, but not limited hereto. More specifically, the lithium titanium oxide may be $Li_{1.33}Ti_{1.67}O_4$ or $LiTi_2O_4$ having a spinel structure with a good crystal structure that has little change during charge and discharge cycle.

In the present disclosure, the negative electrode active material layer includes LTO secondary particles, and the LTO secondary particle may be formed as a plurality of LTO primary particles are agglomerated.

In a preferred embodiment of the present disclosure, a volume-average particle size distribution $D_{50}$ of the primary particle may be 0.01 μm to 1 μm, or more preferably, 0.05 μm to 0.8 μm. Further, the volume-average particle size distribution $D_{50}$ may be 2 μm to 20 μm, or more preferably, 2 μm to 15 μm. Here, the volume-average particle size distribution $D_{50}$ represents a diameter of a particle that corresponds to 50% of the total particle volume when the diameter is measured and the volume is accumulated from the smallest particle.

In the present disclosure, the primary particle or the secondary particle has a sphere or pseudo-sphere shape. As used herein, the 'pseudo-sphere shape' has a three dimensional volume including an oval shape, and includes all forms of particles including amorphous particle in which a shape cannot be specified.

Further, in an embodiment of the present disclosure, the negative electrode active material layer is a porous structure in which a plurality of pores are present. Such porous structure may be caused for example from one or more of the characteristics according to shapes of various LTO particles to be described below.

The LTO secondary particle has the porous structure in which a plurality of pores are formed on a surface and in a body of the secondary particle due to a plurality of pores formed between the agglomerated primary particles. In one aspect of the present disclosure, the LTO particle includes at least 50 wt %, or at least 60 wt %, or at least 70 wt %, or at least 80 wt %, or at least 90 wt %, or at least 95 wt %, or at least 99 wt % of the secondary particles compared to 100 wt % of the LTO. As a ratio of the secondary particles in the LTO increases, porous characteristic of the LTO tends to increase. The LTO particle may preferably be the secondary particles, although it may include a small amount of free primary particles which are not agglomerated.

Further, the LTO primary particle may have the porous structure in which a plurality of primary particles are formed on the surface or the internal body of the particles. Being connected with one or more adjacent other pores, the pores may serve as a path for electrolyte. Accordingly, the pores formed within the particle and connected to each other may function as a migration path for electrolyte. Finally, as the LTO secondary particles are brought into contact with the other secondary particles or the primary particles included in the other adjacent secondary particles, the pores formed between the two contacted particles may influence the porous characteristics of the negative electrode active material layer.

The LTO has the spinel structure and is advantageous for implementing quick-charging, high-output characteristics because of a three dimensional Li diffusion path. Further, the structural stability is excellent because of the characteristics to keep an original crystal structure during charging and discharging, and SEI is not generated because of relatively high reaction potential (~1.5 V), and heat stability is obtained because exothermic reaction occurring while SEI is disintegrated can be avoided. This is related with long lifetime characteristics of the LTO negative electrode. Despite many advantages such as quick charging and long lifetime characteristics, the LTO has disadvantages in which capacity versus graphite negative electrode is smaller than a battery using a related graphite by 40% and ion diffusion velocity is also slow because a discharge voltage is decreased by at least 1 V. In order to solve the problem mentioned above, the LTO particles may be prepared into less than 1 μm. However, in this case, as a specific surface area increases, a large quantity of a binder is required and dispersion is difficult. Therefore, the secondary particles in which the primary particles are agglomerated are suggested. However, as the pore size and distribution within the particle are irregular, excess or deficiency of the electrolyte or irregularity in using the active material occurs. Therefore, the present disclosure provides the negative electrode with improved input and output characteristics by optimizing a size of the LTO particle, and pore size and ratio.

Based on the aspects mentioned above, the negative electrode according to the present disclosure has a volume of the meso pores having a long diameter of 0.1 μm or greater accounts for 10 vol % to 50 vol % of 100 vol % of the entire pores present in the negative electrode active material layer. When a volume of the meso pores does not reach the range mentioned above, a volume of the pores is too little, ion and/or electron conduction is impeded, and electrolyte impregnation efficiency is lowered. Further, because a number of dissociated Li ions near the LTO primary particles becomes less, output characteristics versus capacity according to the active material may deteriorate. On the other hand, when greatly exceeding this range, the porosity of the negative electrode increases too high, making loading amount of the active material versus a negative electrode area insufficient, or interval of the active material particles are too wide, causing energy density to deteriorate and thus deteriorating output characteristics or conductivity.

The meso pores of the present disclosure may be the primary pores and/or the secondary pores, and preferably, the secondary pores. More preferably, the secondary pores may be at least 50 vol %, or at least 75 vol %, compared to 100 vol % of the meso pores.

Further, in the present disclosure, a pore volume of the LTO primary particles and/or secondary particles may be 0.01 $cm^3$/g to 1 $cm^3$/g, and preferably, 0.1 $cm^3$/g to 1 $cm^3$/g, or more preferably, 0.5 $cm^3$/g to 1 $cm^3$/g.

According to a preferred embodiment of the present disclosure, a size of an x-ray diffraction measurement average crystallite in the LTO may be 500 Å to 1500 Å, and preferably, 800 Å to 1300 Å. When a size of the average crystallite does not reach 500 Å, a problem may occur, such as increasing electrolyte side reaction. When exceeding 1500 Å, output characteristics of the battery may deteriorate.

Further, in the LTO primary particles and/or secondary particles, an amount of lithium carbonate, which is by-product thereof, may be 2 wt % or less, 1 wt % or less, 0.5 wt % or less, 0.1 wt % or less, or 0.05 wt % or less compared to 100 wt % LTO.

According to a preferred embodiment of the present disclosure, the porosity of the negative electrode active material layer may be 40% to 60%. Preferably, it may be 40%. The 'porosity' may herein indicate a ratio of volume occupied by the pores with respect to a volume of the negative electrode active material layer, in which % is used as a basic unit.

In the present disclosure, in order to measure a volume of the pores in the negative electrode active material layer and the LTO particles, a method for measuring pore distribution such as mercury intrusion including Porosimeters, or gas absorption method including BET may be used. However, exemplary embodiments are not limited thereto.

The lithium titanium oxide particle may be prepared with a coprecipitation method, a sol-gel method, or a hydrothermal method, which are liquid phase synthetic methods, although exemplary embodiments are not limited hereto. The preparation method is not specifically limited as long as the lithium titanium oxide particle having the characteristics of the present disclosure can be prepared.

In a preferred embodiment of the present disclosure, after the LTO primary particle is prepared, the LTO secondary particle may be prepared with a separate assembly process. Or, the secondary particle may be prepared through one process, according to which the primary particles are agglomerated simultaneously upon the primary particles are generated.

In a preferred embodiment of the present disclosure, the LTO secondary particle may be yielded with a method including a) forming a primary particle precursor by wet-milling a material including one or more element selected from a group consisting of titanium (Ti) source material, Zr, B, Sn, S, Be, Ge and Zn, b) forming a secondary particle precursor by spray-drying the primary particle precursor, c) adding a lithium (Li) source material to the secondary particle precursor and dry-mixing the same, and d) sintering the secondary particle precursors.

Forming the secondary particle precursors from the primary particle precursors may include forming the secondary particle precursors by supplying the primary particle precursors into a chamber provided in a spray drying equipment and spray-drying the same. The primary particle precursors may be sprayed through a disc rotating at a high speed within the chamber, and spraying and drying may be performed in the same chamber. Further, for implementation of desired average diameter and internal porosity to be achieved with respect to the negative electrode active material, conditions for spray-drying, for example, flowrate of carrier gas, residence time within a reactor, internal pressure, and so on, may be properly controlled. For example, internal porosity of the secondary particle may be controlled through drying temperature adjustment, and it is advantageous to perform the controlling at a temperature as low as possible for high density of the secondary particle. A related spray drying equipment may be used. For example, an ultrasound spray drying equipment, an air nozzle spray drying equipment, an ultrasound nozzle spray drying equipment, a filter expansion aerosol generating equipment, or an electrostatic spray drying equipment may be used, but not limited hereto. Sintering may be performed at a temperature of 450° C. to 600° C.

In a specific aspect of the present disclosure, the negative electrode active material layer may further include a binder resin and a conductor. In an example, the negative electrode active material layer may include negative electrode active material:conductor:binder resin with a weight ratio of 80-90: 7-13:3-9.

Further, the negative electrode active material layer may further include, as the negative electrode active material, one or two or more active materials selected from a group consisting of a carbon-based material, transition metal oxide, and Si-based and Sn-based materials, which are used generally as the negative electrode active material beside the LTO.

As a non-limiting example of the binder resin, one or a mixture of two or more selected from polytetrafluoroethylene (PTFE), polyvinylidenefluoride (PVDF), carboxymethylcellulose (CMC), polyvinyl alcohol (PVA), poly vinyl butyral (PVB), poly-N-vinylpyrrolidone (PVP), styrene butadiene rubber (SBR), polyamide-imide, polyimide, and so on, may be used, but not limited hereto.

The conductor is not be specifically limited as long as it is an electronically conductive material which does not cause a chemical change, and may include, for example, metal powder or metal fiber of natural graphite, artificial graphite, carbon black, acetylene black, ketjen black, super-p black, carbon fiber, copper, nickel, aluminum, silver, and so on.

In a preferred embodiment of the present disclosure, the negative electrode may be prepared according to the following method. First, negative electrode slurry is prepared by dispersing the negative electrode active material, the binder resin, and the conductor in an organic solvent such as ethanol (EtOH), acetone, isopropylalcohol, N-methylpyrrolidone (NMP), and propylene glycol (PG) or a suitable solution such as water, and the prepared slurry is compressed into an electrode shape, or coated on metal foil and formed into an electrode shape, or the composition for the negative electrode is milled with a roller into a sheet state and attached to the metal foil to form an electrode shape. The resultant electrode shape is dried at a temperature of 100° C.-350° C., thus forming the negative electrode. To explain an embodiment of forming the negative electrode more specifically, the negative electrode slurry may be compressed and molded by using a roll press molding device. The roll press molding device is provided to enhance density of the electrode and control a thickness of the electrode through rolling, and includes upper and lower rolls, a controller that can control a thickness and a heating temperature of the rolls, and a winding unit for winding and unwinding the electrode. The rolling process is performed as the electrode in a roll state passes through a roll press, and the electrode is wound back into a roll state and completed accordingly. At this time, an applied pressure of the press may be 5 ton/cm$^2$-20 ton/cm$^2$ and a temperature of the roll may be 0° C.-150° C., preferably. The slurry after the press compression process described above undergoes the drying process. The drying process may be performed at a temperature of 100° C.-350° C., and preferably, 150° C.-300° C. At this time, when a drying temperature is less than 100° C., it is not desirable because solvent is hardly evaporated. Also, when drying is performed at a high temperature exceeding 350° C., it is not desirable because the conductor may undergo oxidization. Accordingly, a drying temperature may be 100° C. or higher, while not exceeding 350° C., preferably. The drying process may be preferably performed at the temperature described above for about 10 min-6 min. The drying process may enhance strength of the negative electrode by binding powder particles simultaneously while drying (solution evaporation) the molded composition for the negative electrode.

Further, the present disclosure provides a lithium ion secondary battery or a hybrid super capacity including the negative electrode prepared as described above. The lithium ion secondary battery may be generally composed of a unit cell including the negative electrode, a positive electrode, and a separator and the electrolyte interposed between the positive electrode and the negative electrode. Further, the present disclosure provides a negative electrode of the lithium ion battery or a hybrid super capacity, which includes the negative electrode prepared as described above.

The lithium secondary battery may be generally and basically composed of at least one unit cell which includes the negative electrode, the separator, and the positive electrode. The positive electrode may include Li-containing transition metal oxide as the positive electrode active material. For example, one or a mixture of two or more selected from the group consisting of $Li_xCoO_2$ (0.5<x<1.3), $Li_xNiO_2$ (0.5<x<1.3), $Li_xMnO_2$ (0.5<x<1.3), $Li_xMn_2O_4$ (0.5<x<1.3), $Li_x(Ni_aCo_bMn_c)O_2$ (0.5<x<1.3, 0<a<1, 0<b<1, 0<c<1, a+b+c=1), $Li_xNi_{1-y}Co_yO_2$ (0.5<x<1.3, 0<y<1), $Li_xCo_{1-y}Mn_yO_2$ (0.5<x<1.3, 0≤y<1), $Li_xNi_{1-y}Mn_yO_2$ (0.5<x<1.3, 0≤y<1), $Li_x(Ni_aCo_bMn_c)O_4$ (0.5<x<1.3, 0<a<2, 0<b<2, 0<c<2, a+b+c=2), $Li_xMn_{2-z}Ni_zO_4$ (0.5<x<1.3, 0<z<2), $Li_xMn_{2-z}Co_zO_4$ (0.5<x<1.3, 0<z<2), $Li_xCoPO_4$ (0.5<x<1.3) and $Li_xFePO_4$ (0.5<x<1.3) may be used, and the Li-containing transition metal oxide described above may be coated with metal or metal oxide such as aluminum (Al). Further, besides the aforementioned LI-containing transition metal oxide, sulfides, selenides, halides and the like may also be used. Preferably, the high-voltage positive electrode may be used. The high-voltage positive electrode includes one or more selected from lithium nickel-manganese-cobalt complex oxide, lithium manganese oxide and lithium manganese metal complex oxide, which is the high potential oxide having spinel structure, as the positive electrode active material.

The separator generally has a porous film shape including a plurality of pores. Such porous separator is not specifically limited, and may be prepared in a form of a film, a nonwoven fabric, or a woven fabric shape, according to related methods known in the art. As a non-limiting example, the separator may be a film, a nonwoven fabric or a woven fabric formed of one or a mixture of two or more polymers selected from a group consisting of polyethylene, polypropylene, polyethyleneterephthalate, polybutyleneterephthalate, polyester, polyacetal, polyamide, polycarbonate, polyimide, polyetheretherketone, polyaryletherketone, polyetherimide, polyamideimide, polybenzimidazole, polyethersulfone, polyphenyleneoxide, cyclic olefin copolymer, polyphenylenesulfide and polyethylenenaphthalene.

Further, the porous separator may additionally include a porous coating layer including inorganic particles and the binder as known in the art. The inorganic particles may be selected from a group consisting of inorganic particles having a dielectric constant of 5 or higher, inorganic particles having the ability of transferring lithium ions, or a mixture thereof. The binder may be one or a mixture of two or more selected from a group consisting of polyvinylidene fluoride (PVDF), polyacrylic acid (PAA), polyethylene glycol (PEG), polypropylene glycol (PPG), toluene diisocyanate (TDI), polymethyl methacrylate, polyacrylonitrile, polyvinylpyrrolidone, polyvinyl acetate, polyethylene-co-vinyl acetate, polyethylene oxide, cellulose acetate, cellulose acetate butyrate, cellulose acetate propionate, cyanoethylpullulan, cyanoethylpolyvinylalcohol, cyanoethyl cellulose, cyanoethyl sucrose, pullulan, carboxyl methyl cellulose (CMC), acrylonitrile-styrene-butadiene copolymer, polyimide, polyvinylidenefluoride, polyacrylonitrile and styrene butadiene rubber (SBR), but not limited hereto.

The electrolyte used in the present disclosure includes a salt in a $A^+B^-$ structure. In the structure described above, $A^+$ includes alkali metal cation such as $Li^+$, $Na^+$, $K^+$, or ions consisting of a combination thereof, and preferably, $Li^+$ ions. $B^-$ includes anion such as $F^-$, $Cl^-$, $Br^-$, $I^-$, $NO_3^-$, $BF_4^-$, $PF_6^-$, $N(CN)_2^-$, $SCN^-$, $ClO_4^-$, $AsF_6^-$, $CF_3SO_3^-$, $(CF_3SO_2)_2^-$, $C(CF_2SO_2)_3^-$, $(CF_3)_3PF_3^-$, $(CF_3)_4PF_2^-$, $(CF_3)_5PF^-$, $(CF_3)_6P^-$, $(CF_3CF_2SO_2^-)_2N$, $(CF_3SO_2)_2N^-$, $CF_3SO_3^-$, $CF_3CF_2(CF_3)_2CO^-$, $(CF_3SO_2)_2CH^-$, $(CF_3SO_2)_3C^-$, $CF_3(CF_2)_7SO_3^-$, $CF_3CO_2^-$, and $CH_3CO_2^-$ or ions consisting of a combination thereof. Preferably, the salt with such $A^+B^-$ structure is lithium salt.

The $A^+B^-$ structure of the salt may be dissolved or dissociated in the organic solvent. As a non-limiting example, the organic solvent may be propylene carbonate (PC), ethylene carbonate (EC), diethyl carbonate (DEC), dimethyl carbonate (DMC), dipropyl carbonate (DPC), dimethyl sulfoxide, acetonitrile, dimethoxy ethane, diethoxy ethane, tetra hydrofuran, N-methyl-2-pyrrolidone (NMP), ethylmethyl carbonate (EMC), gamma-butyrolactone (γ-butyrolactone) or a mixture thereof.

The present disclosure also provides a battery module including the lithium ion secondary battery described above as unit cell, and a battery pack including the battery module. The battery pack may be used as a power supply for a device demanding high temperature stability, long cycle characteristics, and high rate characteristics. As a specific example of the device, there may be a power tool moving by electric power received from a battery motor; an electric vehicle including an electric vehicle (EV), a hybrid electric vehicle (HEV), a plug-in hybrid electric vehicle (PHEV), and so on; an electric two-wheeled vehicle including an electric bike E-bike and an electric scooter Escooter; an electric golf cart; and a power storage system, but not limited hereto.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

EXAMPLE

A secondary particle form of LTO ($Li_4Ti_5O_{12}$) was prepared. A pore volume of the prepared LTO particle was 0.1 cm$^3$/g and a ratio of the meso pore was 25 vol %. A pore volume of the LTO and a ratio of the meso pore were measured by using the mercury intrusion Porosimeter. The prepared LTO, carbon black (super P), and PVdF were mixed with a weight ratio of 84:6:10, which was then mixed in N-methyl-2-pyrrolidone solvent to prepare slurry. The prepared slurry was coated on one surface of a copper current collector, dried, rolled, and punched into a certain size, so that a negative electrode was prepared. A loading amount of the negative electrode was 1.1 mAh/cm$^2$. Next, $LiNi_{0.4}Mn_{0.3}Co_{0.3}O_2$ Denka Black and PVdF were mixed with a weight ratio of 91:3.5:5.5 and added to NMP so that the slurry was prepared. The slurry was coated on an aluminum foil, and rolled and dried so that a positive electrode was prepared. For electrolyte, ethylene carbonate and diethyl carbonate were mixed with a volume ratio of 30:70 and added with $LiPF_6$ so that 1M $LiPF_6$ non-aqueous electrolyte was prepared. A porous polyethylene separator was interposed between the negative electrode and the positive electrode and with the electrolyte injection, a pouch-type monocell was prepared.

Comparative Example

A secondary particle form of LTO ($Li_4T_5O_{12}$) was prepared. A pore volume of the prepared LTO particle was 0.1 cm$^3$/g and a ratio of the meso pore was 8 vol %. A pore volume of the LTO and a ratio of the meso pore were measured by using the mercury intrusion Porosimeter. The prepared LTO particle, carbon black (super P), and PVdF were mixed with a weight ratio of 84:6:10, which was next mixed in N-methyl-2-pyrrolidone solvent to prepare slurry. The prepared slurry was coated on one surface of a copper current collector, dried, rolled, and punched into a certain size so that a negative electrode was prepared. Next, $LiNi_{0.4}Mn_{0.3}Co_{0.3}O_2$ Denka Black and PVdF were mixed with a weight ratio of 91:3.5:5.5 and added to NMP so that the slurry was prepared. The slurry was coated on an aluminum foil with a loading amount of 1 mAh/cm², and rolled and dried so that a positive electrode was prepared. As electrolyte, ethylene carbonate and diethyl carbonate were mixed with a volume ratio of 30:70 and added with $LiPF_6$ so that 1M $LiPF_6$ non-aqueous electrolyte was prepared. A porous polyethylene separator was interposed between the negative electrode and the positive electrode and with the electrolyte injection, a pouch-type monocell was prepared.

Resistance Measurement at Charging and Discharging

Figure 2:
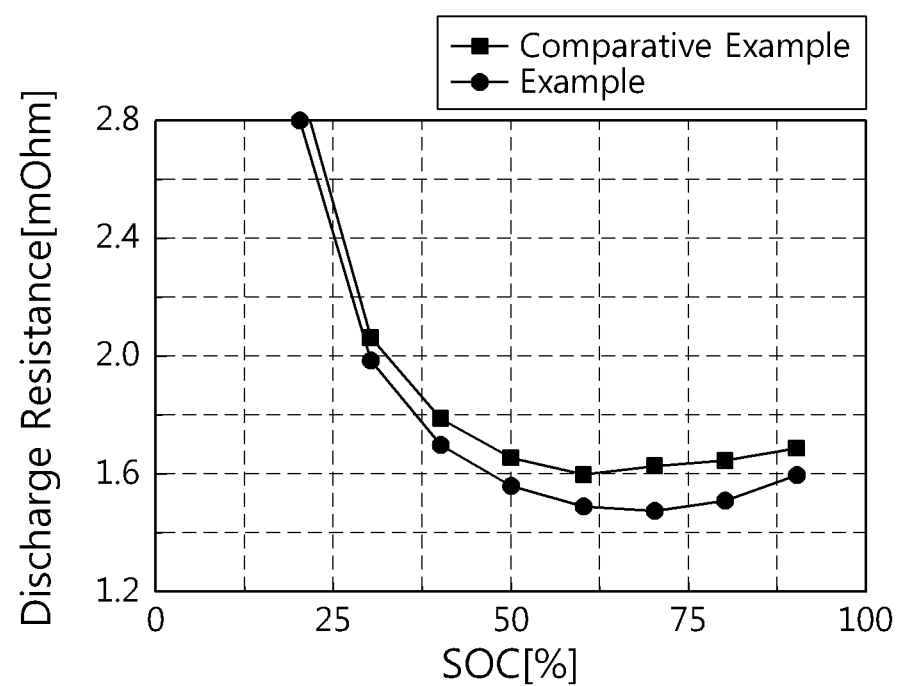
FIG. 2 illustrates by plotting the discharge resistance values according to SOCs of batteries prepared in an Example of the present disclosure and a Comparative Example.

With respect to the battery prepared in the Example and the Comparative Example, 10-sec discharge resistance was measured with 10C per SOC at 2.5 V of a final charge voltage and 1.0 V of a final discharge voltage. As can be observed in FIG. 2, negative electrode loading amounts were similar between the Example and the Comparative Example. However, the battery according to the Example exhibited greater outputs than the Comparative Example.

What is claimed is:

1. A negative electrode for a lithium secondary battery comprising:
   a current collector, and a negative electrode active material layer formed on at least one side surface of the current collector,
   wherein the negative electrode active material layer comprises lithium titanium oxide expressed with chemical formula 1 as follows as a negative electrode active material,
   the negative electrode active material comprises secondary particles in which primary particles of lithium titanium oxide (LTO) are agglomerated,
   the negative electrode active material layer is present with a plurality of pores, and
   a volume of a meso pore having a long diameter of the pores of 0.1 μm or greater accounts for 10 vol % to 50 vol % in 100 vol % of entire pores present in the negative electrode active material layer $Li_xTi_yO_zM_w$ [Chemical formula 1]

where, M is one or a mixture of two or more selected from a group consisting of Zr, B, Sn, S, Be, Ge and Zn, $0.5 \leq x \leq 3$, $1 \leq y \leq 5$, $2 \leq z \leq 12$, $0 \leq w < 0.1$.

2. The negative electrode of claim 1, wherein the meso pore comprises a primary pore and/or a secondary pore, wherein the primary pore is a pore formed on a surface and in a body of the primary particle, and the secondary pore is a pore formed between the adjacent primary particle and/or secondary particle.

3. The negative electrode of claim 2, wherein the negative electrode active material layer comprises 50 vol % or more of the secondary pore compared to 100 vol % of the meso pore.

4. The negative electrode of claim 1, wherein the negative electrode active material layer has a porosity of 40% to 60%.

5. The negative electrode of claim 1, wherein lithium titanium oxide expressed with the chemical formula 1 is one or more selected from a group consisting of $Li_{0.8}Ti_{2.2}O_4$, $Li_{2.67}Ti_{1.33}O_4$, $Li_{1.33}Ti_{1.67}O_4$, $Li_{1.14}Ti_{1.71}O_4$, $Li_4Ti_5O_{12}$, and $Li_2TiO_3$.

6. The negative electrode of claim 1, wherein the lithium titanium oxide primary particle has a diameter $D_{50}$ of 0.01 μm to 1 μm.

7. The negative electrode of claim 1, wherein the lithium titanium oxide secondary particle has a diameter $D_{50}$ of 2 μm to 20 μm.

8. The negative electrode of claim 1, wherein the lithium titanium oxide primary particle is a porous particle having a plurality of pores formed on a surface and in a body of the particle.

9. The negative electrode of claim 1, wherein the lithium titanium oxide secondary particle is a porous particle having a plurality of pores formed on a surface and in a body of the particle.

10. The negative electrode of claim 1, wherein a pore of the negative electrode active material layer comprises a pore formed on a surface and in a body of the primary particle, a pore formed between the primary particles, a pore formed between the primary particle and the secondary particle, and a pore formed between the secondary particles.

11. The negative electrode of claim 1, wherein the negative electrode active material has lithium carbonate in an amount of 2 wt % or less compared to 100 wt % of total lithium titanium oxide.

12. The negative electrode of claim 1, wherein the lithium titanium oxide has an x-ray diffraction measurement average crystallite size of 800 Å to 1300 Å.

13. A lithium secondary battery comprising the negative electrode according to claim 1.

* * * * *